(12) United States Patent
Synnott et al.

(10) Patent No.: US 7,207,771 B2
(45) Date of Patent: Apr. 24, 2007

(54) TURBINE SHROUD SEGMENT SEAL

(75) Inventors: Remy Synnott, St. Jean-sur-Richelieu (CA); Dany Blais, Ste. Julie (CA)

(73) Assignee: Pratt & Whitney Canada Corp., Longueuil (CA)

( * ) Notice: Subject to any disclaimer, the term of this patent is extended or adjusted under 35 U.S.C. 154(b) by 178 days.

(21) Appl. No.: 10/965,234

(22) Filed: Oct. 15, 2004

(65) Prior Publication Data
US 2006/0083607 A1 Apr. 20, 2006

(51) Int. Cl.
*F04D 29/08* (2006.01)
(52) U.S. Cl. ............... 415/173.1; 415/173.3
(58) Field of Classification Search ............ 415/173.1, 415/173.3, 173.4, 173.5, 173.6, 174.2, 174.3, 415/174.5, 170.1, 209.3, 209.2
See application file for complete search history.

(56) References Cited

U.S. PATENT DOCUMENTS

| | | | |
|---|---|---|---|
| 3,394,919 A | 7/1968 | Catterfeld | |
| 3,825,365 A | 7/1974 | Peng | |
| 4,573,866 A | 3/1986 | Sandy, Jr. et al. | |
| 4,798,392 A | 1/1989 | Tozer | |
| 5,145,316 A | 9/1992 | Birch | |
| 5,188,506 A | 2/1993 | Creevy et al. | |
| 5,188,507 A * | 2/1993 | Sweeney | 415/173.1 |
| 5,372,476 A | 12/1994 | Hemmelgarn et al. | |
| 5,423,659 A | 6/1995 | Thompson | |
| 5,513,955 A | 5/1996 | Barcza | |
| 5,562,408 A | 10/1996 | Proctor et al. | |
| 5,630,593 A | 5/1997 | Swensen et al. | |
| 5,716,052 A | 2/1998 | Swensen et al. | |
| 5,738,490 A | 4/1998 | Pizzi | |
| 5,988,975 A | 11/1999 | Pizzi | |
| 6,076,835 A | 6/2000 | Ress et al. | |
| 6,199,871 B1 | 3/2001 | Lampes | |
| 6,237,921 B1 | 5/2001 | Liotta et al. | |
| 6,299,178 B1 | 10/2001 | Halling | |
| 6,409,471 B1 * | 6/2002 | Stow | 415/173.1 |
| 6,450,762 B1 | 9/2002 | Munshi | |
| 6,547,522 B2 * | 4/2003 | Turnquist et al. | 415/173.3 |
| 6,648,333 B2 | 11/2003 | Aksit et al. | |
| 6,659,472 B2 | 12/2003 | Aksit et al. | |
| 6,932,566 B2 * | 8/2005 | Suzumura et al. | 415/135 |
| 6,962,482 B2 * | 11/2005 | Tanaka | 415/173.1 |

* cited by examiner

*Primary Examiner*—Edward K. Look
*Assistant Examiner*—Dwayne J White
(74) *Attorney, Agent, or Firm*—Ogilvy Renault LLP

(57) ABSTRACT

A ring seal for sealing an annular gap defined between opposed surfaces of concentric inner and outer annular engine parts in a gas turbine engine. The ring seal being wholly disposed within the annular gap and having a wave pattern with alternating peaks. The ring seal radially inwardly loads the inner engine part and provides a fluid seal between the inner and outer engine parts.

18 Claims, 3 Drawing Sheets

TURBINE SHROUD SEGMENT SEAL

TECHNICAL FIELD

The invention relates generally to a seal for a gas turbine engine, and more particularly, to an improved turbine shroud segment seal.

BACKGROUND OF THE ART

Seals provided between turbine shroud segments and outer supporting housings in gas turbine engines are well-known. Such seals reduce gas flow between inner cooling air cavities, defined within the turbine shroud segments, and the main engine hot gas path defined radially within the turbine shroud segments. In many engine designs, relatively cool secondary air flow is fed from the compressor to the cooling cavities defined within the turbine shroud segments to provide cooling thereof. In order to prevent leakage of this cooling air into the main gas path, seals are preferably provided between the upstream and downstream edges of the turbine shroud segments and the outer supporting shroud housing.

In order to achieve a tight clearance gap between the turbine blade tips and the surrounding shroud segments, it is common to grind the shroud segments, once assembled, until the desired tip clearance is achieved. Most known turbine shroud segment seals, however, require a special fixture in order to load the segments radially inward during this grinding operation in order to prevent the grinding wheel from pushing the shroud segments outward as a result of deflections in the shroud seals. This results in increased and unacceptable tolerances between the turbine blade tips and the surrounding turbine shroud segments.

A simplified turbine shroud seal which is economical to manufacture and which obviates the need for special retaining fixtures of the shroud segment during assembly grinding operations is accordingly desired.

SUMMARY OF THE INVENTION

It is therefore an object of the present invention to provide an improved turbine shroud segment seal.

In a first aspect, the present invention provides a ring seal for sealing an annular gap defined between opposed surfaces of concentric inner and outer annular engine parts in a gas turbine engine, said opposed surfaces being radially spaced apart by a first distance, said ring seal being wholly disposed within said annular gap and having a wave pattern with alternating peaks defining an uncompressed radial height therebetween greater than said first distance, said ring seal disposed within said annular gap exerts solely a radial force on said inner engine part relative to said outer engine part which is fixed, thereby radially inwardly loading said inner engine part and providing a fluid seal between said inner and outer engine parts.

In a second aspect, the present invention provides a ring seal for sealing an annular gap radially defined between an axially extending outer surface of at least one turbine shroud segment and an axially extending inner surface of a surrounding shroud housing in a gas turbine engine, said ring seal being wholly disposed within said annular gap and having a wave pattern with alternating peaks, said ring seal exerting a radially inward force on said turbine shroud segment such that said turbine shroud segment is radially inwardly loaded.

In a third aspect, the present invention provides a ring seal for a turbine blade tip shroud in a gas turbine engine having a hot main gas flow passage and an outer casing, the shroud being located between the main gas flow passage and a cooling passage formed between the shroud and at least a portion of the outer casing, the shroud having at least one axially extending mounting platform for engagement with corresponding mounting structure of the outer casing such that an annular gap is defined between radially spaced walls formed on the mounting platform of the shroud and the mounting structure of the outer casing, wherein the ring seal is wholly disposed between the radially spaced walls within the annular gap and provides fluid sealing between said main gas flow passage and said cooling passage, said ring seal having a wave pattern with alternating peaks abutting and radially extending between said radially spaced walls, and said ring seal acting on said shroud to exert a radially inward force thereon such that said shroud is inwardly loaded.

There is also provided, in accordance with the present invention, a method of assembling a gas turbine engine, comprising the steps of: mounting a turbine shroud segment to a casing; providing a seal between the shroud segment and the casing; and grinding the shroud segment to provide accurate tip clearance, wherein radial support for the shroud segment during grinding is provided substantially by the seal.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
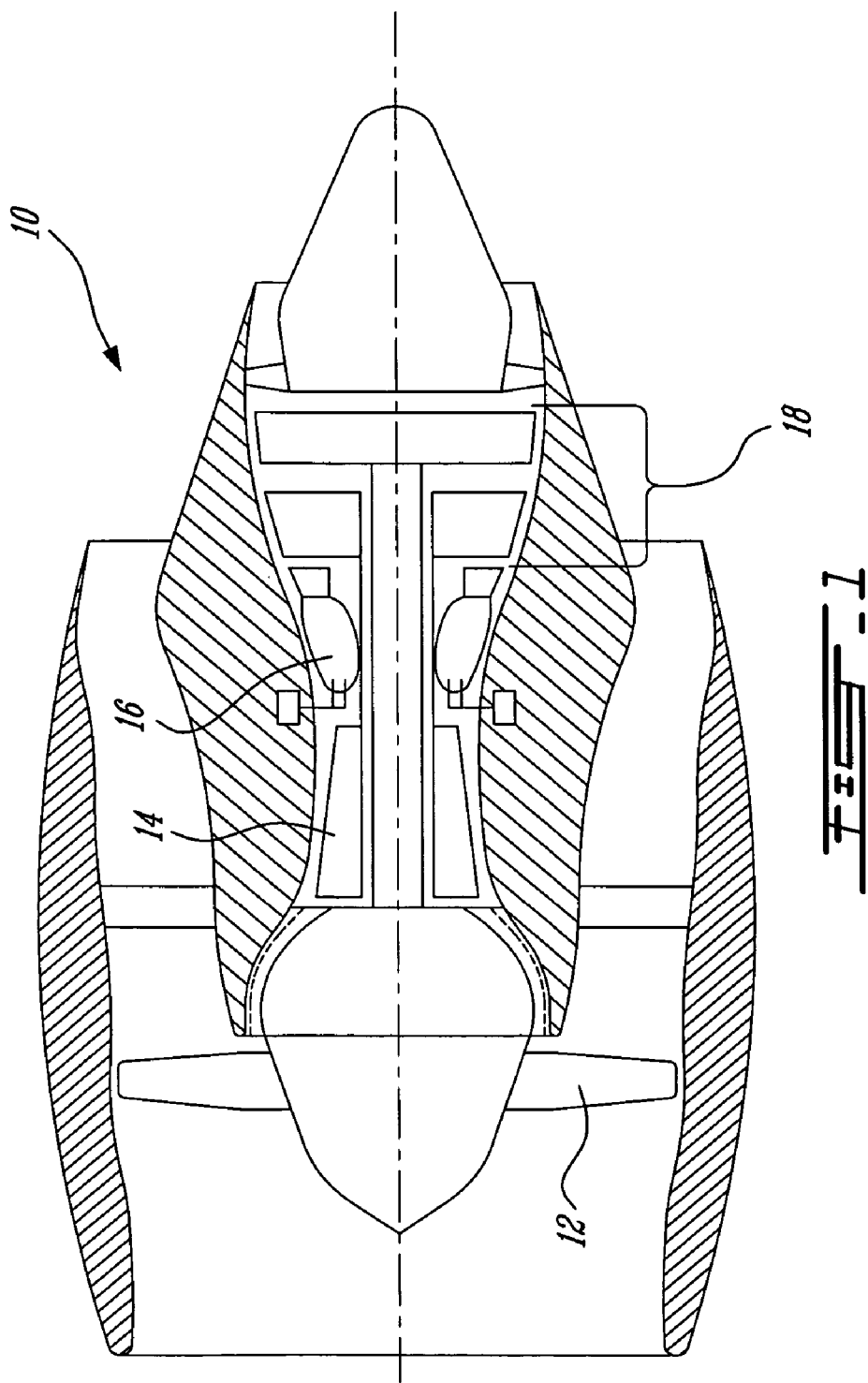
FIG. 1 is a schematic cross-section of a gas turbine engine.

FIG. 1 illustrates a gas turbine engine 10 of a type preferably provided for use in subsonic flight, generally comprising in serial flow communication a fan 12 through which ambient air is propelled, a multi-stage compressor 14 for pressurizing the air, a combustor 16 in which the compressed air is mixed with fuel and ignited for generating an annular stream of hot combustion gases, and a turbine section 18 for extracting energy from the combustion gases.

The turbine section 18 may comprise several turbine stages, each of which generally includes a rotatable turbine rotor having a plurality of blades extending therefrom within a surrounding turbine shroud. A plurality of vanes, arranged in an annular configuration, are provided immediately upstream of each turbine rotor.

Figure 2:
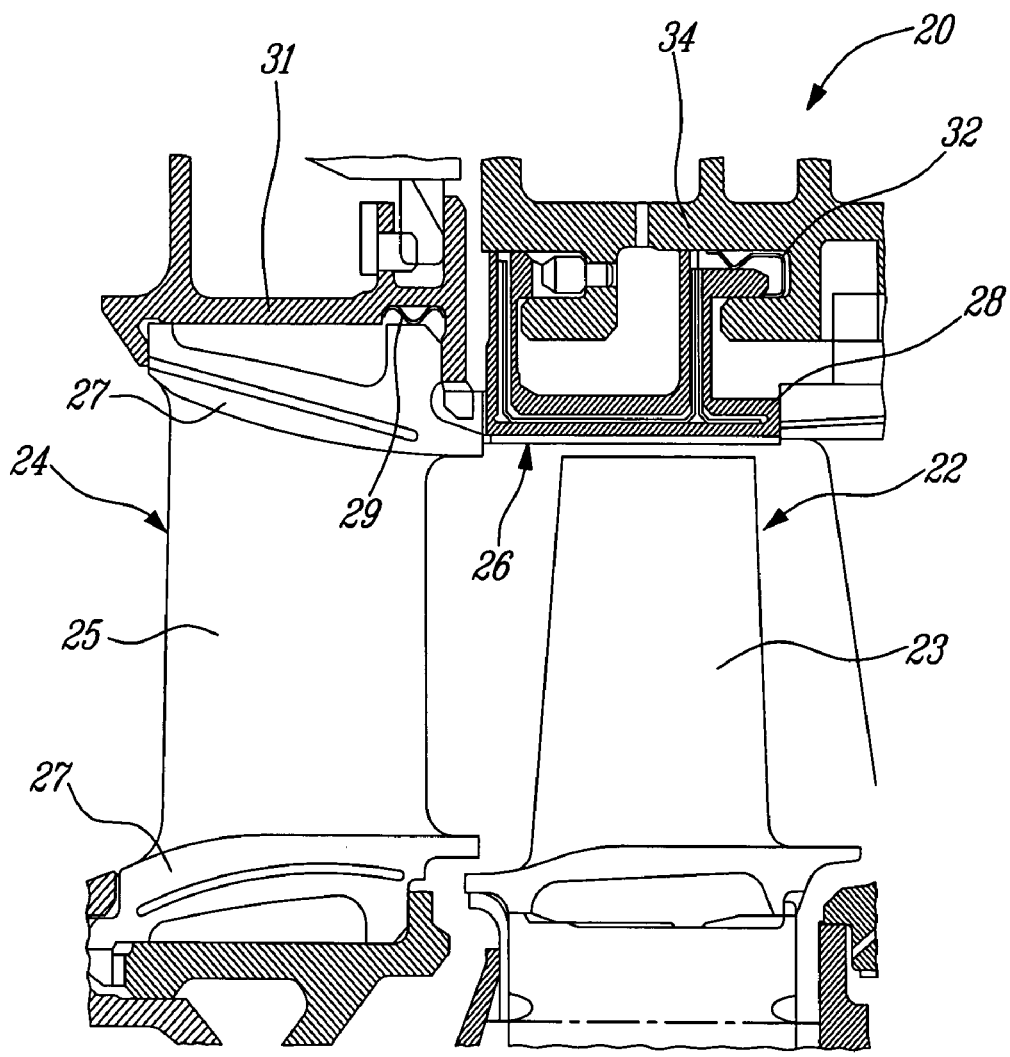
FIG. 2 is a partial cross-sectional view of a turbine shroud segment seal of the prior art.

Referring to prior art FIG. 2, a turbine stage 20 of a gas turbine engine includes generally a turbine rotor 22 having a plurality of radially extending blades 23 and a turbine stator vane assembly 24 comprising a plurality of vanes 25 extending between inner and outer vane platforms 27. Surrounding the turbine blades 23, and downstream of the stator vane assembly 24, is an annular turbine shroud 26, which typically comprises a plurality of individual shroud segments 28 concentrically arranged around the periphery of the turbine blade tips. The shroud segments 28 are supported and located within the engine by an outer housing support structure 34. Spring seals 32 provide sealing between the shroud segments 28 and the surrounding support structure 34. While the spring seals 32 having a configuration as depicted in FIG. 2 provide adequate sealing properties, their relatively complex shape makes them expensive to manufacture. Further, additional support is required during the shroud grinding operations to prevent unwanted radial outward movement of the shroud and seals. Other shapes of ring seals are also employed elsewhere in gas turbine engines. For example, M-shaped seals 29 are known to be employed between the main platforms 27 and their surrounding support structure 31 for sealing purposes only.

Figure 3:
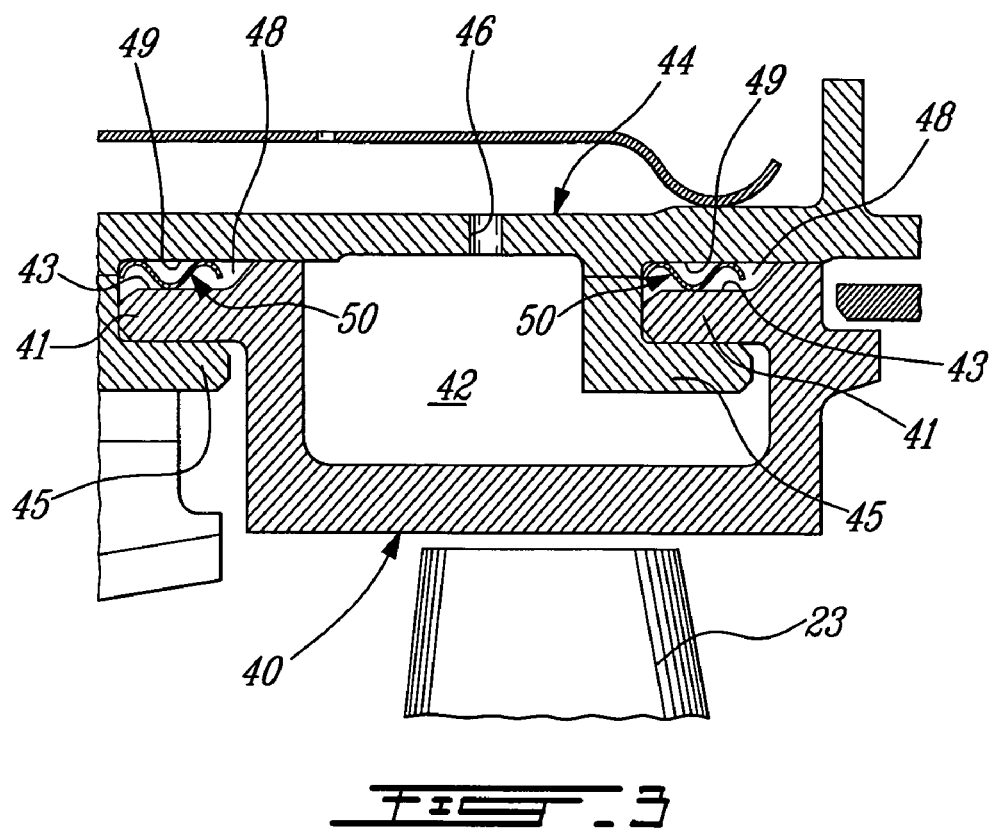
FIG. 3 is a partial cross-sectional view of turbine shroud segment seals in accordance with the present invention.
Figure 4:
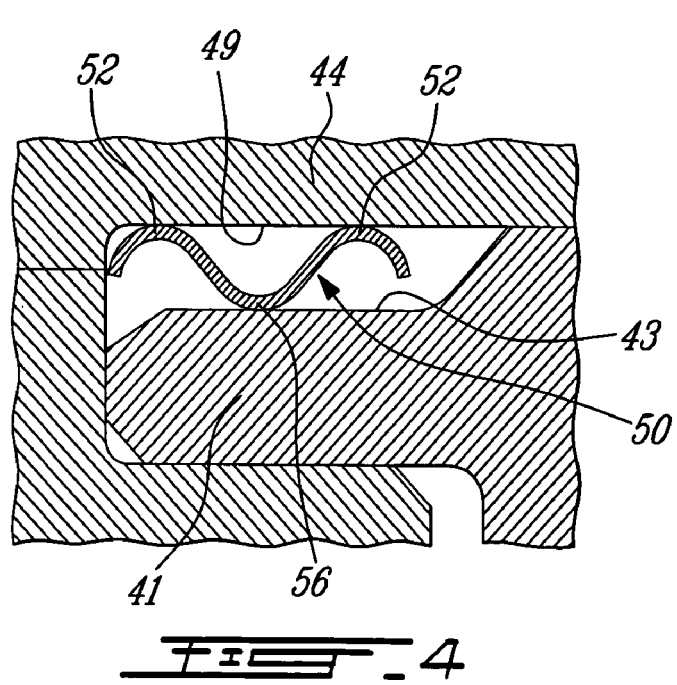
FIG. 4 is a partial cross-sectional view of the turbine shroud segment seal of FIG. 3 shown in greater detail.

Referring now to the present invention as depicted in FIGS. 3 and 4, a plurality of shroud segments 40 surrounding turbine rotor blades 23 include axially extending mounting platforms 41 which engage, and are preferably received within, corresponding mounting flange projections 45 of the surrounding shroud housing 44 in order to help locate the shroud segments 40 in position within the turbine section of the gas turbine engine. Internal cavities 42 are defined within the turbine shroud segments 40 and are generally provided with secondary cooling air via apertures 46 defined in the surrounding housing 44. According to the present invention, M-shaped sealing rings 50 are wholly disposed within annular gaps 48, defined between the opposed surfaces of the mounting platforms 41 of the shroud segments 40 and the mounting flanges 45 of the surrounding housing 44. Particularly, the sealing rings 50 are disposed between an axially extending outer surface 43 of the mounting platforms 41 and an axially extending inner surface 49 of the surrounding shroud housing 44. The M-shaped sealing rings 50 act to seal the shroud cavity 42 such that leakage of cooling air from the cavity 42 into the main gas path is at least limited, if not prevented. The sealing is particularly achieved by radially pinching the M-shaped sealing rings 50 between the axial projections 41 of the turbine shroud segments 40 and the surrounding outer housing 44.

M-shaped sealing rings 50 are preferably provided both at the upstream and downstream engagement points of the shroud segments 40, between the shroud segments and the surrounding housing. The M-shaped sealing rings 50 further act to load the shroud segments 40 radially inward, and thereby obviate the need for additional shroud supports at least during the shroud grinding operation performed following assembly of the turbine section of the gas turbine engine. This shroud grinding step is performed in order to achieve the precise tip clearance gap desired between the turbine blade tips and the surrounding shroud segments, thereby minimizing tip clearance losses. The M-shaped sealing rings 50 also have a simplified shape in comparison with the more complex sealing rings 32 known in the prior art for sealing turbine shroud segments, and are therefore less costly to produce than the turbine shroud seals 32 of the prior art, which have a significantly more complex shape necessitating more forming operations.

The M-shaped sealing rings 50 may be constructed as an annular ring to be fitted within the annular gap 48. The M-shaped sealing rings may also be provided with a split therein to allow circumferential expansion if necessary.

Referring now to FIG. 4, the M-shaped sealing rings 50 comprise preferably three substantially evenly spaced peaks, namely two outer peaks 52 which abut the inner surface 49 of the outer shroud housing 44, and a central inner peak 56 which abuts the outer surface 43 of the axial projections 41 of the shroud segments. Thus, the M-shaped sealing rings 50 provide radially inward loading of the shroud segments 40 within the fixed outer housing 44. This configuration of the M-shaped sealing rings permits sufficient radial inward force to be exerted on the shroud segments 40, thus preventing unwanted outward movement thereof during the above described shroud grinding operation. The M-shaped sealing rings 50 therefore provide a simple and cost effective seal which acts to load the component, particularly to load the turbine shroud segments 40 radially inward, while maintaining a sealing ability sufficient to prevent leakage of cooling air.

The above description is meant to be exemplary only, and one skilled in the art will recognize that changes may be made to the embodiments described without department from the scope of the invention disclosed. For example, the sealing rings of the present invention may be made of any material suitable for the given application. Further, while the ring seals of the present invention are preferably M-shaped with three alternating peaks, they nevertheless comprise a wave pattern having at least two alternating peaks and may include more than three while maintaining a configuration which is cost effective to manufacture. Still other modifications which fall within the scope of the present invention will be apparent to those skilled in the art, in light of a review of this disclosure, and such modifications are intended to fall within the appended claims.

The invention claimed is:

1. A ring seal for sealing an annular gap defined between opposed surfaces of concentric inner and outer annular engine parts in a gas turbine engine, said opposed surfaces being radially spaced apart by a first distance, said ring seal being wholly disposed within said annular gap and having a wave pattern with at least two alternating peaks defining an uncompressed radial height therebetween greater than said first distance, said ring seal disposed within said annular gap with each of the alternating peaks abutting one of the inner and the outer engine parts, said ring seal exerting solely a radial force on said inner engine part relative to said outer engine part which is fixed, thereby radially inwardly loading said inner engine part and providing a fluid seal between said inner and outer engine parts.

2. The ring seal as defined in claim 1, wherein said alternating peaks are defined in said ring seal with substantially even axial spacing.

3. The ring seal as defined in claim 1, wherein said wave pattern includes three alternating peaks.

4. The ring seal as defined in claim 3, wherein said wave pattern defines a substantially "M"-shaped configuration.

5. The ring seal as defined in claim 4, wherein two of said three alternating peaks abut said outer engine part and one of said three alternating peaks, disposed between said two peaks, abuts said inner engine part.

6. The ring seal as defined in claim 1, wherein said ring seal is an unbroken annular seal.

7. The ring seal as defined in claim 1, wherein said ring seal comprises two ring seal portions disposed respectively at upstream and downstream ends of the inner engine part.

8. The ring seal as defined in claim 1, wherein said inner engine part includes at least one axially extending mounting platform received within a corresponding mounting flange of said fixed outer engine part such that said inner engine part is axially retained in place, said annular gap being defined between said opposed surfaces of said mounting platform and said mounting flange.

9. The ring seal as defined in claim 1, wherein said inner engine part is a turbine shroud assembly and said outer engine part is a turbine shroud housing.

10. The ring seal as defined in claim 9, wherein said turbine shroud assembly comprises a plurality of circumferentially arranged turbine shroud segments.

11. The ring seal as defined in claim 9, wherein said turbine shroud assembly defines an annular cooling cavity therein, between said turbine shroud housing and said turbine shroud assembly, said cooling cavity being in fluid flow communication with a cooling air source of the gas turbine engine such that said turbine shroud assembly is cooled, said ring seal providing a fluid seal between said cooling cavity and a main gas flow passage of the gas turbine engine.

12. A ring seal for sealing an annular gap radially defined between an axially extending outer surface of at least one turbine shroud segment and an axially extending inner surface of a surrounding shroud housing in a gas turbine engine said ring seal being wholly disposed within said annular gap and having a wave pattern with at least two alternating peaks each abutting one of the inner and outer surfaces, said ring seal exerting a radially inward force on said turbine shroud segment such that said turbine shroud segment is radially inwardly loaded.

13. The ring seal as defined in claim 12, wherein said wave pattern includes three alternating peaks.

14. The ring seal as defined in claim 13, wherein said wave pattern defines a substantially "M"-shaped configuration.

15. The ring seal as defined in claim 14, wherein two peaks of said three alternating peaks abut said shroud housing and one of said three alternating peaks, disposed between said two peaks, abuts said turbine shroud segment.

16. The ring seal as defined in claim 15, wherein said ring seal comprises two ring seal portions disposed respectively at upstream and downstream ends of the turbine shroud segment.

17. A ring seal for a turbine blade tip shroud in a gas turbine engine having a hot main gas flow passage and an outer casing, the shroud being located between the main gas flow passage and a cooling passage formed between the shroud and at least a portion of the outer casing, the shroud having at least one axially extending mounting platform for engagement with corresponding mounting structure of the outer casing such that an annular gap is defined between radially spaced walls formed on the mounting platform of the shroud and the mounting structure of the outer casing, wherein the dug seal is wholly disposed between the radially spaced walls within the annular gap and provides fluid sealing between said main gas flow passage and said cooling passage, said ring seal having a wave pattern with alternating peaks radially extending between said radially spaced walls and each abutting one of said radially spaced walls, and said ring seal acting on said shroud to exert a radially inward force thereon such that said shroud is inwardly loaded.

18. A method of assembling a gas turbine engine, comprising the steps of:
   mounting a turbine shroud segment to a casing;
   providing a seal between the shroud segment and the casing, and
   grinding the shroud segment to provide accurate tip clearance, wherein radial support for the shroud segment during grinding is provided substantially by the seal.

* * * * *

UNITED STATES PATENT AND TRADEMARK OFFICE
CERTIFICATE OF CORRECTION

| | | |
|---|---|---|
| PATENT NO. | : 7,207,771 B2 | Page 1 of 1 |
| APPLICATION NO. | : 10/965234 | |
| DATED | : April 24, 2007 | |
| INVENTOR(S) | : Remy Synnott and Dany Blais | |

It is certified that error appears in the above-identified patent and that said Letters Patent is hereby corrected as shown below:

Claim 17, column 6, line 15, delete "dug", insert --ring--

Signed and Sealed this

Twenty-sixth Day of June, 2007

JON W. DUDAS
*Director of the United States Patent and Trademark Office*